United States Patent
Fu et al.

(10) Patent No.: US 11,709,286 B1
(45) Date of Patent: Jul. 25, 2023

(54) METHOD, SYSTEM, AND DEVICE FOR FULL-WAVEFORM INVERSION DEGHOSTING OF MARINE VARIABLE DEPTH STREAMER DATA ACQUISITION

(71) Applicant: China University of Petroleum (East China), Qingdao (CN)

(72) Inventors: Liyun Fu, Qingdao (CN); Zhiwei Wang, Qingdao (CN); Yu Wu, Qingdao (CN); Qizhen Du, Qingdao (CN); Qingqing Li, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 17/882,570

(22) Filed: Aug. 7, 2022

(30) Foreign Application Priority Data

Mar. 21, 2022 (CN) .......................... 202210274674.5

(51) Int. Cl.
*G01V 1/30* (2006.01)
*G01V 1/38* (2006.01)
*G01V 1/18* (2006.01)

(52) U.S. Cl.
CPC ................ *G01V 1/30* (2013.01); *G01V 1/181* (2013.01); *G01V 1/3843* (2013.01); *G01V 2210/1423* (2013.01); *G01V 2210/60* (2013.01)

(58) Field of Classification Search
CPC ........ G01V 1/30; G01V 1/181; G01V 1/3843; G01V 2210/1423; G01V 2210/60
See application file for complete search history.

(56) References Cited

U.S. PATENT DOCUMENTS

2009/0043545 A1   2/2009   van Manen et al.
2012/0243373 A1   9/2012   Shin
(Continued)

FOREIGN PATENT DOCUMENTS

CN   102608659 A   7/2012
CN   107450103 A   12/2017
(Continued)

OTHER PUBLICATIONS

English machine translation of Liu et al. (CN 109613608 A) (Year: 2019).*

(Continued)

*Primary Examiner* — Roy Y Yi
*Assistant Examiner* — Geoffrey T Evans
(74) *Attorney, Agent, or Firm* — Bayramoglu Law Offices LLC

(57) ABSTRACT

A method, a system, and a device for full-waveform inversion deghosting for a marine variable depth streamer data acquisition are provided for solving existing problems that deghosted seismic data has low accuracy and is accompanied by artifacts due to a large error in ghost prediction. The provided method includes: acquiring seismic data, jointly solving Lippmann-Schwinger equations to obtain normal derivatives of an incident wave field and a wave field of a receiver surface, performing a wave field extrapolation by a Kirchhoff equation that includes only an integral on the receiver surface to obtain a wave field of a sea surface recorded by a horizontal streamer, calculating a ghost operator, and subjecting the ghosted wave field of the sea surface recorded by the horizontal streamer to full-waveform inversion deghosting to obtain deghosted seismic data. The provided method improves the accuracy and signal-to-noise ratio (SNR) of deghosted seismic data.

16 Claims, 9 Drawing Sheets

(56) References Cited

U.S. PATENT DOCUMENTS

2016/0025878 A1  1/2016  Shin
2021/0223424 A1  7/2021  Valensi et al.

FOREIGN PATENT DOCUMENTS

| CN | 109613608 A | * | 4/2019 | ............ G01V 1/282 |
| CN | 109765616 A | | 5/2019 | |
| CN | 109975868 A | | 7/2019 | |
| CN | 110780348 A | | 2/2020 | |
| CN | 111538088 A | | 8/2020 | |
| CN | 114428324 A | | 5/2022 | |

OTHER PUBLICATIONS

Fons Ten Kroode, Prediction of internal multiples, Wave Motion, 2002, pp. 315-338, vol. 35.

Guan Xi-Zhu, et al., Boundary-volume integral equation numerical modeling for complex near surface, Chinese Journal of Geophysics, 2011, pp. 2357-2367, vol. 54, No. 9.

Weijia Sun, et al., Compensation for transmission losses based on one-way propagators in the mixed domain, Seophysics, 2012, pp. S65-S72, vol. 77, No. 3.

Xie Yueyue, et al., Marine Seismic Data Deghosting With 1.5D Inverse Scattering Series Method, Acta Scientiarum Naturalium Universitatis Pekinensis, 2018, pp. 535-545, vol. 54, No. 3.

Ma De-Zhi, et al., Generation mechanism of ghost wave in marine seismic exploration and ghost wave attenuation from marine seismic data, Geophysical & Geochemical Exploration, 2022, pp. 175-181, vol. 46, No. 1.

Zheng Lei, The Marine Seismic Data Multiple Suppression Techniques and Application, Value Engineering, 2015, pp. 75-78.

* cited by examiner

METHOD, SYSTEM, AND DEVICE FOR FULL-WAVEFORM INVERSION DEGHOSTING OF MARINE VARIABLE DEPTH STREAMER DATA ACQUISITION

CROSS REFERENCE TO THE RELATED APPLICATION

The present application is based upon and claims priority to Chinese Patent Application No. 202210274674.5, filed on Mar. 21, 2022, the entire content of which is hereby incorporated by reference.

TECHNICAL FIELD

The present disclosure belongs to the field of marine geological exploration and, in particular, relates to a method, a system, and a device for full-waveform inversion deghosting of marine variable depth streamer data acquisition.

BACKGROUND

In marine seismic acquisition in the geophysical field, the ghost reflection (also known as a ghost) reduces frequency bandwidths and seismic recognition. In order to improve imaging quality, it is necessary to select suitable deghosting procedures and methods.

The down-going ghost received by an actual streamer can be regarded as the up-going wave field received by a mirror streamer, and the down-going ghost's relationship with the up-going primary reflection can be expressed by a wave field extension operator. On the basis of a forward model, deghosting can be regarded as an inverse problem, and the forward operator is a subtraction of a unit operator and the wave field extension operator. The forward operator describes the process of a ghost formation, and it needs to accurately estimate the phase and amplitude of the ghost. A horizontal streamer can be accurately described by combining the Kirchhoff integral with the Kirchhoff approximation. However, for a receiver with a curved surface, the Kirchhoff approximation is no longer strictly valid. If the Kirchhoff integral continues to be used for wave field extension, the predicted ghost will have a large error, thereby reducing the accuracy of the solution of the inverse problem, causing artifacts in the deghosting to result.

SUMMARY

To solve the problem of the existing deghosting method that the deghosted seismic data has low accuracy and is accompanied with artifacts due to a large error in ghost prediction, a first aspect of the present disclosure proposes a method for full-waveform inversion deghosting for marine variable depth streamer data acquisition. The method includes the following steps:

S100: acquiring seismic data in a marine seismic exploration process, including a type and dominant frequency of a source, a location of a shot point, an angular frequency, a seawater velocity, a wave field of a receiver surface $\Gamma_1$, a size of a given velocity model, and a spacing of grid points;

S200: constructing Lippmann-Schwinger equations of a region between the receiver surface $\Gamma_1$ and a sea surface $\Gamma_0$ and a region below the receiver surface $\Gamma_1$ and jointly solving the Lippmann-Schwinger equations based on the seismic data to obtain normal derivatives of an incident wave field $p_{in}$ and the wave field of the receiver surface $\Gamma_1$;

S300: performing, based on the wave field and the normal derivative thereof of the receiver surface $\Gamma_1$ and the incident wave field $p_{in}$, wave field extrapolation by a pre-constructed Kirchhoff equation that includes only an integral on the receiver surface $\Gamma_1$ to obtain a wave field of the sea surface $\Gamma_o$ recorded by a horizontal streamer;

S400: acquiring an up-going primary reflection, extrapolating the primary reflection upward to obtain a wave field received by a mirror streamer, and obtaining a ghost operator based on a total wave field received by geophones, where the geophones are located at all grid points and the mirror streamer and a receiver are symmetrical about the sea surface; and

S500: subjecting the ghosted wave field of the sea surface $\Gamma_o$ recorded by the horizontal streamer to full-waveform inversion deghosting based on the ghost operator to acquire deghosted seismic data, that is, seismic data including only primary reflection data.

In some preferred implementations, the Lippmann-Schwinger equation may be:

$$C(r)p(r,\omega) = p_{in}(r,\omega) \oint_{\Gamma_1} \left[ G(r',r,\omega) \frac{\partial p(r',\omega)}{\partial n} - p(r',\omega) \frac{\partial G(r',r,\omega)}{\partial n} \right] d\Gamma_1, r \in \Gamma_1$$

where, $p_{in}$ denotes the incident wave field; r denotes the location of the shot point; $\omega$ denotes the angular frequency; r' denotes a location of a receiving point; $p(r', \omega)$ and $$\frac{\partial p(r',\omega)}{\partial n}$$

denote a wave field and a normal derivative of a closed surface, respectively; $G(r', r, \omega)$ denotes a Green's function; $C(r)$ denotes a coefficient related to a local geometric feature of the surface; $p(r, \omega)$ denotes a wave field value after extension; and $$\frac{\partial}{\partial n}$$

denotes a normal derivative.

In some preferred implementations, the pre-constructed Kirchhoff equation that includes only the integral on the receiver surface $\Gamma_1$ may be:

$$p(r,\omega) = \oint_{\Gamma_1} \left[ G(r',r,\omega) \frac{\partial p(r',\omega)}{\partial n} - p(r',\omega) \frac{\partial G(r',r,\omega)}{\partial n} \right] d\Gamma_1.$$

In some preferred implementations, when the pre-constructed Kirchhoff equation that includes only the integral on the receiver surface $\Gamma_1$ is constructed, a medium above the sea surface $\Gamma_0$ may be assumed to be homogeneous to avoid reflection of any wave field, and boundaries on two sides may be assumed to be at infinity.

In some preferred implementations, the ghost operator may be calculated as follows:

$$p=p_0 31 \ p_m=p_0-Ep_0=Gp_0$$

where p denotes the total wave field received by the geophones; $p_0$ denotes the up-going primary reflection; $p_m$ denotes the wave field received by the mirror streamer; E denotes the wave field extension operator; and G denotes the ghost operator, G=I−E with I being an identity matrix.

In some preferred implementations, the full-waveform inversion deghosting on the ghosted wave field of the sea surface recorded by the horizontal streamer may be expressed by:

$$\min_{p_0} J(p_0) = \frac{1}{2}\|p - Gp_0\|_2^2 + \lambda|p_0|_1$$

where $|\ |_1$ denotes a 1-norm; $\|\ \|_2^2$ denotes a 2-norm; $\lambda$ denotes a regularization term; and J( ) denotes an objective function.

A second aspect of the present disclosure proposes a system for full-waveform inversion deghosting for marine variable depth streamer data acquisition, including a seismic data acquisition module, a joint inversion module, a wave field extrapolation module, a ghost operator acquisition module, and an inverse solution module.

The seismic data acquisition module is configured to acquire seismic data in a marine seismic exploration process, including a type and dominant frequency of a source, a location of a shot point, an angular frequency, a seawater velocity, a wave field of a receiver surface $\Gamma_1$, a size of a given velocity model, and a spacing of grid points.

The joint inversion module is configured to construct Lippmann-Schwinger equations of a region between the receiver surface $\Gamma_1$ and a sea surface $\Gamma_0$ and a region below the receiver surface $\Gamma_1$ and jointly solve the Lippmann-Schwinger equations based on the seismic data to obtain normal derivatives of an incident wave field $p_{in}$ and the wave field of the receiver surface $\Gamma_1$.

The wave field extrapolation module is configured to perform, based on the wave field and the normal derivative thereof of the receiver surface $\Gamma_1$ and the incident wave field $p_{in}$, wave field extrapolation by a pre-constructed Kirchhoff equation that includes only an integral on the receiver surface $\Gamma_1$ to obtain a wave field of the sea surface $\Gamma_0$ recorded by a horizontal streamer.

The ghost operator acquisition module is configured to acquire an up-going primary reflection, extrapolate the primary reflection upward to obtain a wave field received by a mirror streamer, and obtain a ghost operator based on a total wave field received by geophones. The geophones are located at all grid points, and the mirror streamer and a receiver are symmetrical about the sea surface.

The inverse solution module is configured to subject the ghosted wave field of the sea surface $\Gamma_0$ recorded by the horizontal streamer to full-waveform inversion deghosting based on the ghost operator to acquire deghosted seismic data, that is, seismic data including only primary reflection data.

A third aspect of the present disclosure provides a device, including at least one processor and a memory communicatively connected to at least one processor. The memory stores an instruction executable by the processor, and the instruction is executed by the processor to implement the above method for full-waveform inversion deghosting for marine variable depth streamer data acquisition.

A fourth aspect of the present disclosure provides a computer-readable storage medium, which stores a computer instruction that is executed by a computer to implement the above method for full-waveform inversion deghosting for marine variable depth streamer data acquisition.

The invention of the present disclosure has the following beneficial effects:

The invention of the present disclosure improves the accuracy and signal-to-noise ratio (SNR) of deghosted seismic data and solves the problem of artifacts after deghosting.

1) If the surface undulation is large, the accuracy of the extrapolated wave field value obtained by the Kirchhoff approximation is low. The present disclosure derives a new wave field extension operator through the Lippmann-Schwinger equation, such that the wave field extension value obtained by the deghosting technique proposed by the present disclosure is accurate.

2) The invention of the present disclosure derives the new ghost operator based on the Lippmann-Schwinger equation and introduces it into the wave field extension equation to realize the conversion from the marine variable depth streamer recording to the horizontal streamer recording, thus improving the accuracy of wave field extension. The invention of the present disclosure further performs full-waveform inversion deghosting on the seismic data, reducing the number of artifacts existing in the inversion result and obtaining a high-accuracy deghosting result. In this way, the event axis corresponding to the ghost is suppressed, the primary reflection recording is completely preserved, and there are no obvious artifacts in the suppressed profile. The invention of the present disclosure can be widely applied to the field of geophysics (marine seismic exploration imaging) as it relates to the marine geological exploration industry.

BRIEF DESCRIPTION OF THE DRAWINGS

Other features, objectives, and advantages of the present disclosure will become more apparent upon reading the detailed description of the non-limiting embodiments made below with reference to the drawings.

DETAILED DESCRIPTION OF THE EMBODIMENTS

Figure 1:
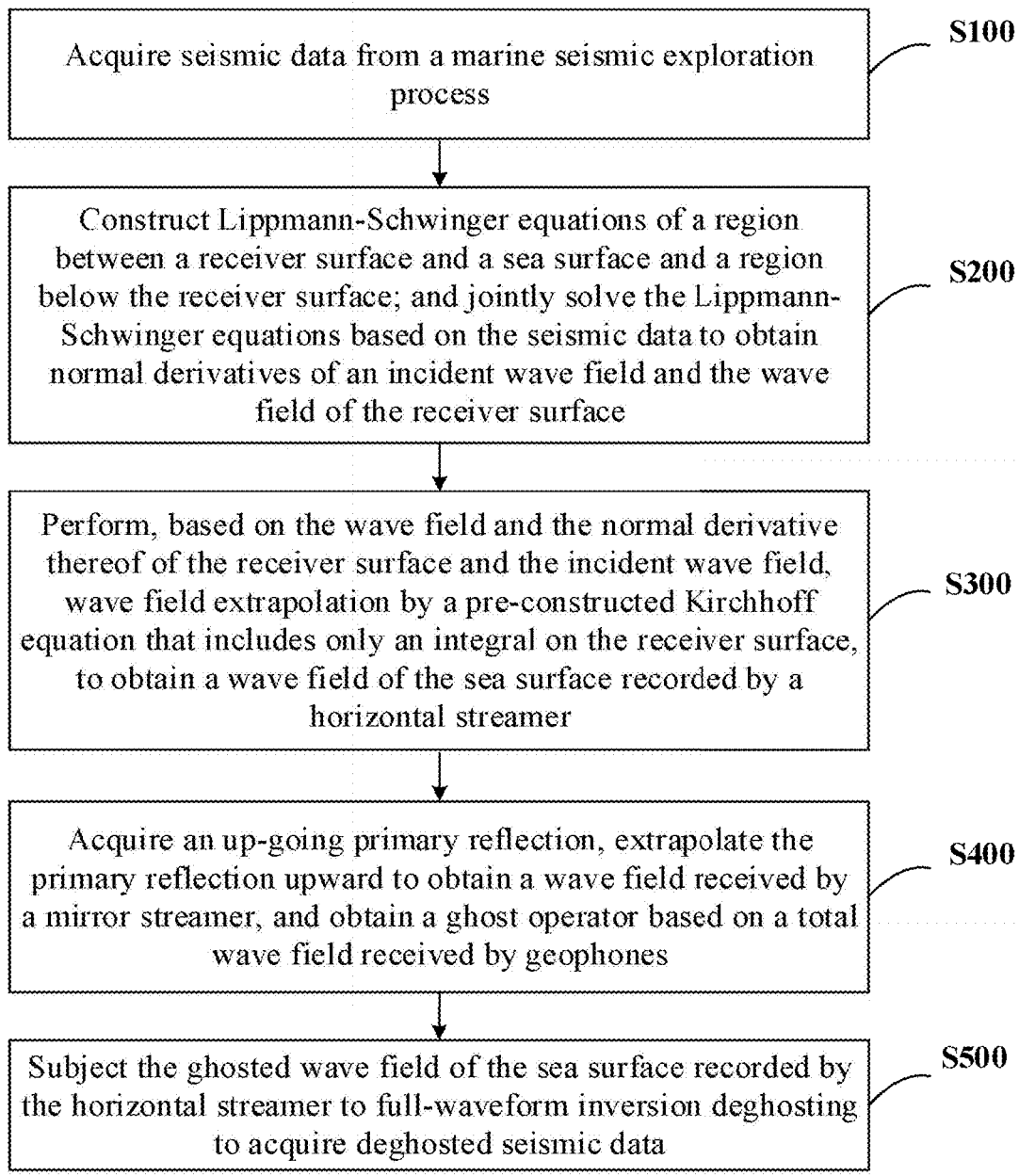
FIG. 1 is a flowchart of a method for full-waveform inversion deghosting for marine variable depth streamer data acquisition according to an embodiment of the present disclosure.

To make the objectives, technical solutions, and advantages of the present disclosure clearer, the technical solutions in the embodiments of the present disclosure are described clearly and completely below with reference to the accompanying drawings. It will be apparent that the described embodiments are part, rather than all, of the embodiments. All other examples obtained by a person of ordinary skill in the art based on the examples of the present disclosure without creative efforts shall fall within the protection scope of the present disclosure.

The present disclosure will be further described in detail below with reference to the drawings and embodiments. It should be understood that the specific embodiments described herein are merely intended to explain the present disclosure, rather than to limit the present disclosure. It should also be noted that, for convenience of description, only the parts related to the present disclosure are shown in the drawings.

It should be noted that the embodiments in the present disclosure and features in the embodiments may be combined with each other if no conflict occurs.

The present disclosure provides a method for full-waveform inversion deghosting for marine variable depth streamer data acquisition. As shown in FIG. 1, the method includes the following steps:

S100: Acquire seismic data in a marine seismic exploration process, including a type and dominant frequency of a source, a location of a shot point, an angular frequency, a seawater velocity, a wave field of a receiver surface $\Gamma_1$, a size of a given velocity model, and a spacing of grid points.

S200: Construct Lippmann-Schwinger equations of a region between the receiver surface $\Gamma_1$ and a sea surface $\Gamma_0$ and a region below the receiver surface $\Gamma_1$ and jointly solve the Lippmann-Schwinger equations based on the seismic data to obtain normal derivatives of an incident wave field $p_{in}$ and the wave field of the receiver surface $\Gamma_1$.

S300: Perform, based on the wave field and the normal derivative thereof of the receiver surface $\Gamma_1$ and the incident wave field $p_{in}$, wave field extrapolation by a pre-constructed Kirchhoff equation that includes only an integral on the receiver surface $\Gamma_1$ to obtain a wave field of the sea surface $\Gamma_0$ recorded by a horizontal streamer.

S400: Acquire an up-going primary reflection, extrapolate the primary reflection upward to obtain a wave field received by a mirror streamer, and obtain a ghost operator based on a total wave field received by geophones, where the geophones are located at all grid points and the mirror streamer and a receiver are symmetrical about the sea surface.

S500: Subject the ghosted wave field of the sea surface $\Gamma_0$ recorded by the horizontal streamer to full-waveform inversion deghosting based on the ghost operator to acquire deghosted seismic data, that is, seismic data including only primary reflection data.

Figure 3:
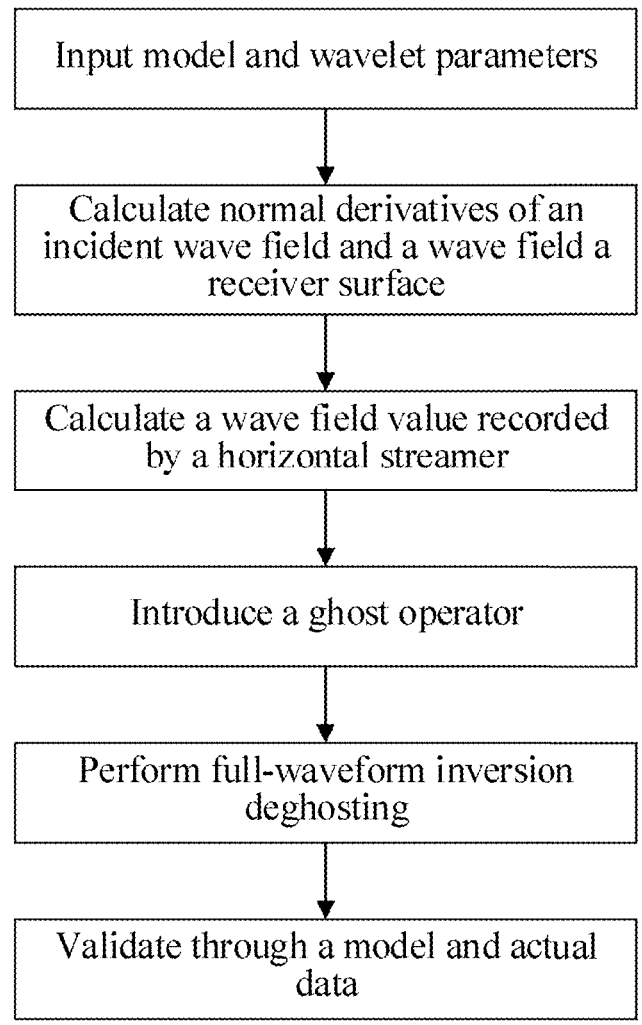
FIG. 3 is a flowchart showing an implementation and validation of the method for full-waveform inversion deghosting for marine variable depth streamer data acquisition according to an embodiment of the present disclosure.

To more clearly describe the method for full-waveform inversion deghosting for marine variable depth streamer data acquisition, the steps of an embodiment of the method are described in detail below according to FIG. 3.

The invention of the present disclosure derives a new ghost operator based on the Lippmann-Schwinger equation and introduces it into the wave field extension equation to realize the conversion from the marine variable depth streamer recording to the horizontal streamer recording, thus improving the accuracy of wave field extension. The present disclosure further performs full-waveform inversion deghosting on the seismic data, thus reducing the number of artifacts existing in the inversion result and obtaining a high-accuracy deghosting result. This process specifically includes:

S100: Acquire seismic data in a marine seismic exploration process, including a type and dominant frequency of a source, a location of a shot point, an angular frequency, a seawater velocity, a wave field of a receiver surface $\Gamma_1$, a size of a given velocity model, and a spacing of grid points.

Figure 5:
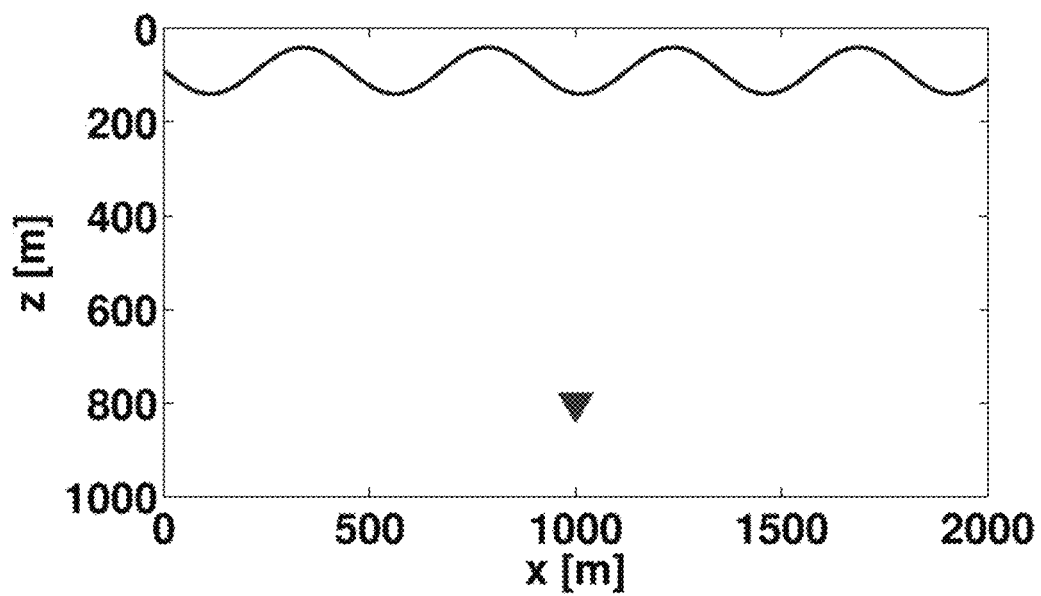
FIG. 5 is a graphical representation of a velocity model of wave field extension according to an embodiment of the present disclosure.

In this embodiment, the method acquires the seismic data in the marine seismic exploration process, including the source type, the dominant frequency of the source, the location of the shot point, the angular frequency, the seawater velocity, the wave field of the receiver surface $\Gamma_1$, the size of the given velocity model, and the spacing of the grid points. In this embodiment, the receiver streamer is a curved streamer. As shown in FIG. 5, in the velocity model designed by the present disclosure, the triangle denotes the source, and the wavy solid line denotes the location of the receiver streamer. The seawater velocity is 1,500 m/s, and the size of the velocity model (i.e., the portion of the seawater that velocity was measured) is preferably set to 1,000 m×2,000 m. The spacing of the grid points (or grids) is preferably 20 m×20 m. The source is preferably a Ricker wavelet with a dominant frequency of 10 Hz.

S200: Construct Lippmann-Schwinger equations of a region between the receiver surface $\Gamma_1$ and a sea surface $\Gamma_0$ and a region below the receiver surface $\Gamma_1$ and jointly solve the Lippmann-Schwinger equations based on the seismic data to obtain normal derivatives of an incident wave field $p_{in}$ and the wave field of the receiver surface $\Gamma_1$.

S300: Perform, based on the wave field and the normal derivative thereof of the receiver surface $\Gamma_1$ and the incident wave field $p_{in}$, wave field extrapolation by a pre-constructed Kirchhoff equation that includes only an integral on the receiver surface $\Gamma_1$ to obtain a wave field of the sea surface $\Gamma_0$ recorded by a horizontal streamer.

The basic equation of wave field extension is a Kirchhoff equation, as shown in Eq. (1):

$$p(r, \omega) = \oint_S \left[ G(r', r, \omega) \frac{\partial p(r', \omega)}{\partial n} - p(r', \omega) \frac{\partial G(r', r, \omega)}{\partial n} \right] dS \quad (1)$$

where S denotes a closed integral surface; G(r', r, ω) denotes a Green's function; r denotes the location of the shot point; ω denotes the angular frequency; r' denotes a location of a receiving point; p(r, ω) and $$\frac{\partial p(r', \omega)}{\partial n}$$

denote a wave field and a normal derivative thereof on the closed surface; p(r, ω) denotes a wave field value after extension; and $$\frac{\partial}{\partial n}$$

denotes a normal derivative. The Kirchhoff integral describes the wave field value and normal derivative on the known closed surface, and the wave field at any point on the closed surface can be derived by the Green's function.

Figure 4:
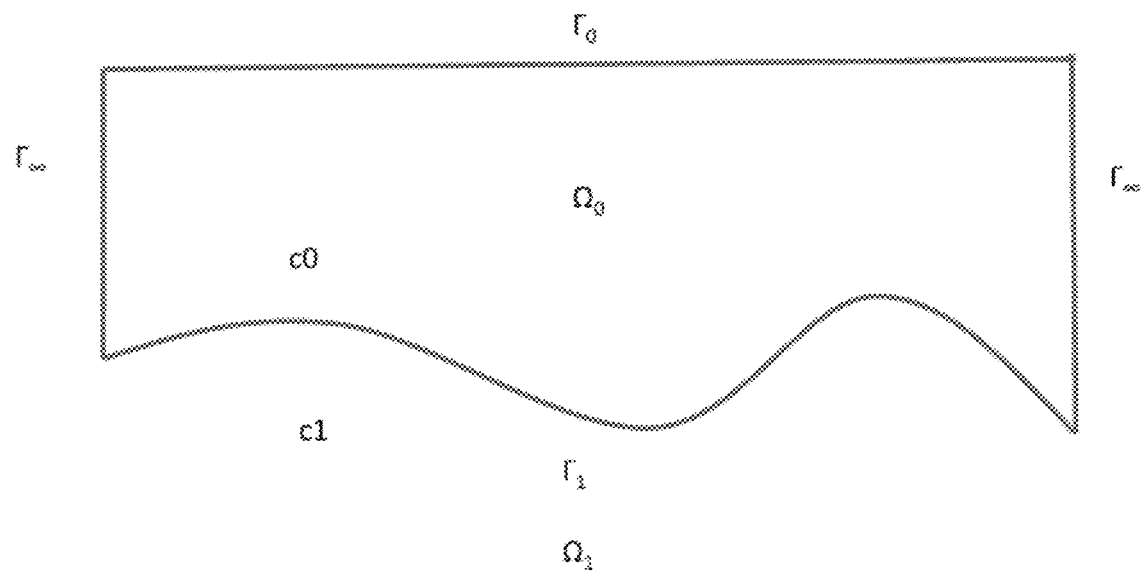
FIG. 4 is a schematic diagram of boundary regions divided by wave field extension according to an embodiment of the present disclosure.

The actual wave field extension issue is shown in FIG. 4. The extension is an upward extension of the wave field on the receiver surface $\Gamma_1$. In general, the medium above the sea surface $\Gamma_0$ (z=0) is assumed to be homogeneous and not to reflect any wave field, and boundaries $\Gamma_\infty$ on two sides are assumed to be at infinity. Therefore, the Kirchhoff integral only includes the integral on the receiver surface $\Gamma_1$.

$$p(r,\omega) = \oint_{\Gamma_1} \left[ G(r',r,\omega) \frac{\partial p(r',\omega)}{\partial n} - p(r',\omega) \frac{\partial G(r',r,\omega)}{\partial n} \right] d\Gamma_1 \quad (2)$$

Figure 6A:
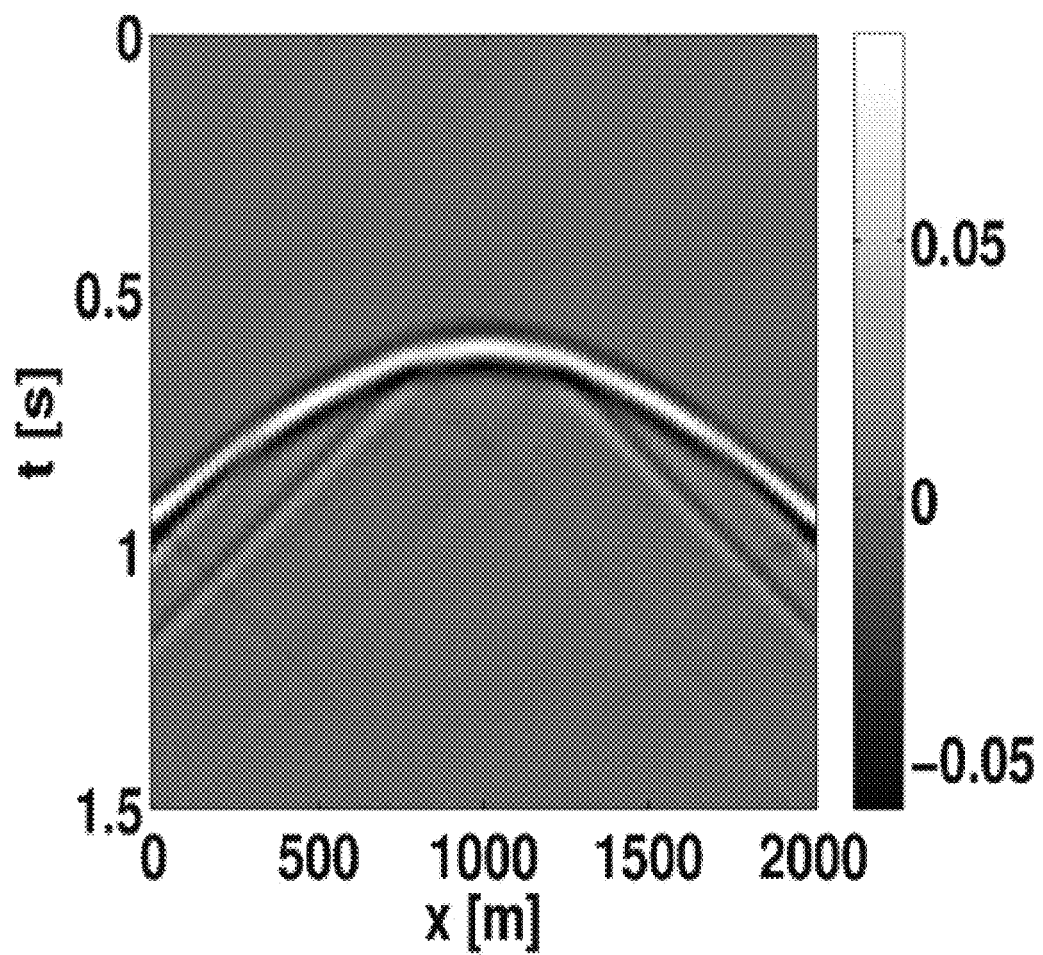
FIG. 6A is a graphical representation of a wave field extension result of a traditional Kirchhoff approximation.

The Kirchhoff approximation adds a Dirichlet boundary condition to the Green's function in Eq. (1) and makes the normal derivative of the Green's function satisfying the Dirichlet boundary condition twice a normal derivative of a Green's function in a free space. However, the Kirchhoff approximation is less accurate in areas with larger surface undulations. FIG. 6A shows a wave field extension result of the traditional Kirchhoff approximation.

In order to achieve accurate wave field extension in the case of curved surfaces, the present disclosure derives a new wave field extension operator. When an observation point r is infinitely close to the receiver surface $\Gamma_1$, the following Lippmann-Schwinger equation is obtained:

$$C(r)p(r,\omega) = \quad (3)$$
$$p_{in}(r,\omega) \oint_{\Gamma_1} \left[ G(r',r,\omega) \frac{\partial p(r',\omega)}{\partial n} - p(r',\omega) \frac{\partial G(r',r,\omega)}{\partial n} \right] d\Gamma_1, r \in \Gamma_1$$

where C(r) denotes a coefficient related to a local geometric feature of the surface, which is a set value and is preferably set as C0: 0.5 and C1: 0.5 in the present disclosure, and $p_{in}$ denotes the incident wave field.

Figure 6B:
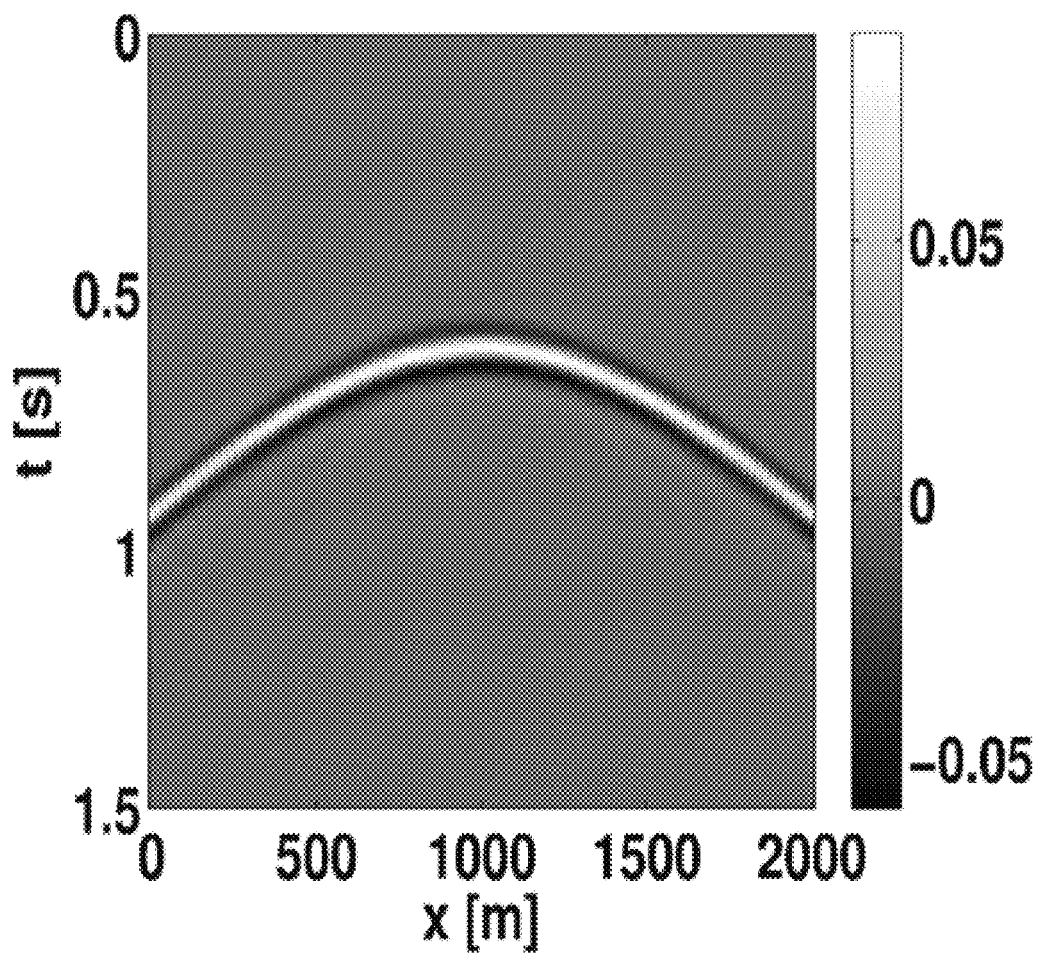
FIG. 6B is a graphical representation of a wave field extension result according to the present disclosure.

In this embodiment, the Lippmann-Schwinger equations of the propagation regions $\Omega_0$ and $\Omega_1$ and (the $\Omega_0$ and $\Omega_1$ regions are shown in FIG. 4) are constructed, that is, the Lippmann-Schwinger equations are discretized in the propagation regions $\Omega_0$ and $\Omega_1$. Through joint inversion, the normal derivatives of the incident wave field $p_{in}$ and the wave field of the receiver surface $\Gamma_1$ are obtained. According to Eq. (2), the accurate wave field extension is calculated, and the wave field of $\Gamma_0$ in the horizontal streamer recording is obtained, as shown in FIG. 6B.

S400: Acquire an up-going primary reflection, extrapolate the primary reflection upward to obtain a wave field received by a mirror streamer, and obtain a ghost operator based on a total wave field received by geophones, where the geophones are located at all grid points, and the mirror streamer and a receiver are symmetrical about the sea surface.

In this embodiment, the total wave field p received by the geophones is the wave field of the receiver surface (also referred to as observation data). $p_0$ denotes the up-going primary reflection, and $p_m$ denotes the wave field received by the mirror streamer. The negative sign indicates that the reflection coefficient of the interface between air and seawater is close to −1. Based on the solution flow of the wave field and its normal derivative in Step S200, the specific flow here is as follows. The wave field of $\Gamma_1$ is known based on the acquired seismic data. Through Step S200, the normal derivative of the wave field of $\Gamma_1$ and the incident wave field $p_{in}$ are obtained. The wave field of $\Gamma_1$ and its normal derivative and the incident wave field $p_{in}$ are substituted into Eq. (1) to calculate the wave field of $\Gamma_0$. In this embodiment, the extension is to calculate a value of another curve from a value on one curve. $p_m$ can be obtained by the upward extension of $p_0$, so the extension process can be expressed as:

$$p = p_0 - p_m = p_0 - E p_0 = G p_0 \quad (4)$$

where, E denotes a wave field extension operator, and G denotes a ghost operator, G=I−E with I being an identity matrix.

S500: Subject the ghosted wave field of the sea surface $\Gamma_0$ recorded by the horizontal streamer to full-waveform inversion deghosting based on the ghost operator to acquire deghosted seismic data, that is, seismic data including only primary reflection data.

In this embodiment, deghosting is an inverse problem. Therefore, the inverse problem equation of the total wave field p received by the geophones and the primary reflection $\Gamma_0$ to be solved can be expressed as:

$$\min_{p_0} J(p_0) = \frac{1}{2} \| p - G p_0 \|_2^2 \quad (5)$$

where p denotes the observation data, $p_0$ is the primary reflection to be solved, and $\| \ \|_2^2$ denotes the 2-norm. In order to achieve the ideal deghosting effect, Eq. (5) introduces a regularization term λ to make up for the lack of effective constraints on the signal at the notch frequency. Therefore, the above equation can be expressed as:

$$\min_{p_0} J(p_0) = \frac{1}{2} \| p - G p_0 \|_2^2 + \lambda |p_0|_1 \quad (6)$$

where denotes the 1-norm, and J( ) denotes an objective function like f(x)=2x+1, where f(x) is an objective function. This equation is to make the number to the right of the equal sign the smallest.

Through full-waveform inversion (i.e. Eq. (6)), deghosting is performed on the ghosted wave field recorded by the horizontal streamer to obtain an ideal deghosting effect, that is, primary reflection data. The primary reflection data obtained after deghosting can be used for offshore seismic exploration imaging, oil and gas exploration, and development, etc. The process of seismic exploration imaging based on the primary reflection data obtained by deghosting is as follows:

After deghosting, primary reflection data, namely seismic data, is acquired, and a source wavelet is extracted from the seismic data. According to the seismic data and the source wavelet, a one-way wave equation is used to carry out the wave field extension, and the source-side wave field and the receiver-side wave field are obtained. The source-side wave field and the receiver-side wave field are cross-correlated to obtain a geological structure imaging result. For the process, please refer to the patent document CN201911059882.8 and "Zheng Lei. Multiple Wave Suppression Technology and Application of Marine Seismic Data [J]. Value Engineering, 2015, 34(10):4."

Alternatively, based on the primary reflection data after deghosting, the wave field extension is carried out frequency by frequency and layer by layer through the wave field extension equation in the frequency wave number domain, and the geological structure imaging results at different depths and frequencies are obtained. The process can be related to the process in the patent document CN202210353352.X.

Further, the marine geological structures are obtained according to the imaging results to extract geological structure attributes, predict reservoirs or perform oil and gas detection, and complete oil and gas exploration and development.

Figure 7A:
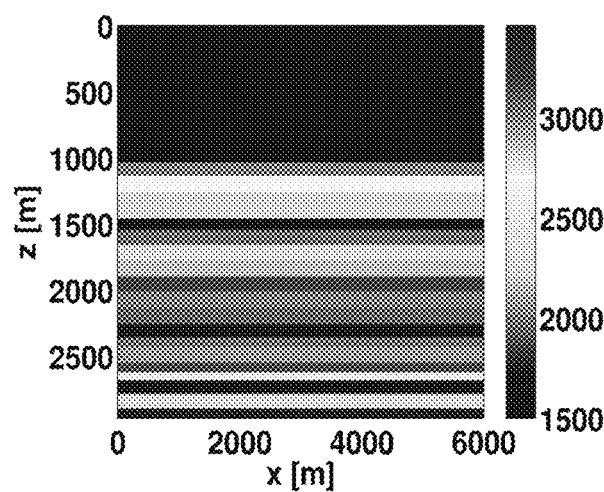
FIG. 7A is a graphical representation of a multi-layer velocity model.
Figure 7B:
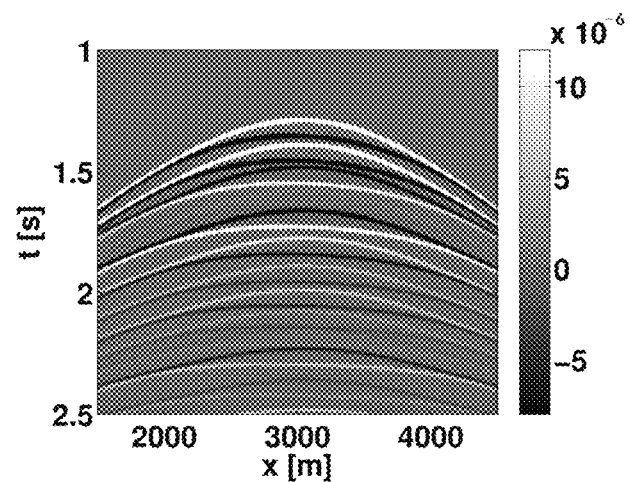
FIG. 7B is a graphical representation ghosted seismic data acquired by the multi-layer velocity model.
Figure 7C:
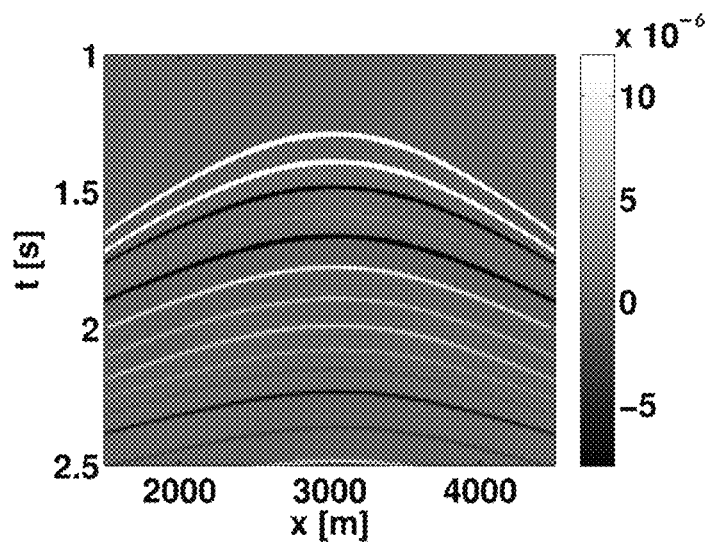
FIG. 7C is a graphical representation of a deghosting result of the ghosted seismic data acquired by the multi-layer velocity model.
Figure 8A:
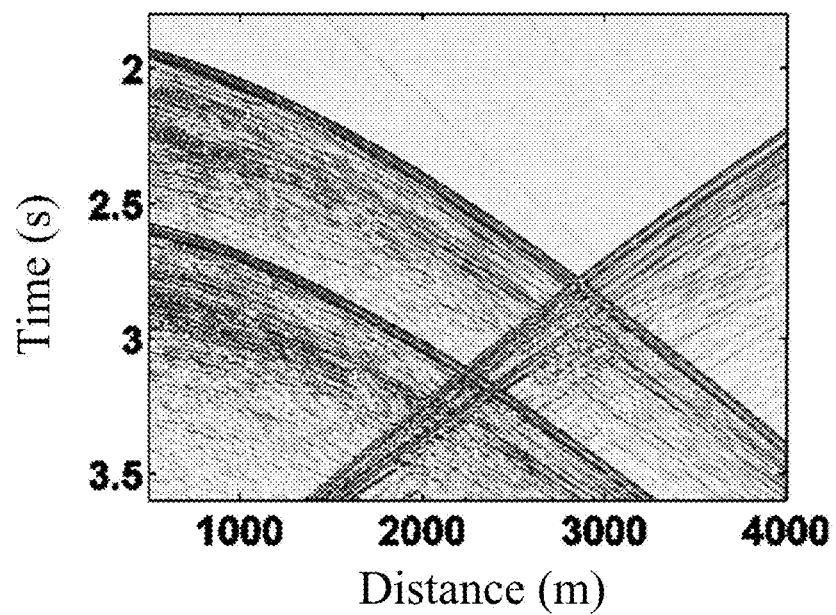
FIG. 8A is a graphical representation of actual ghosted marine seismic data.
Figure 8B:
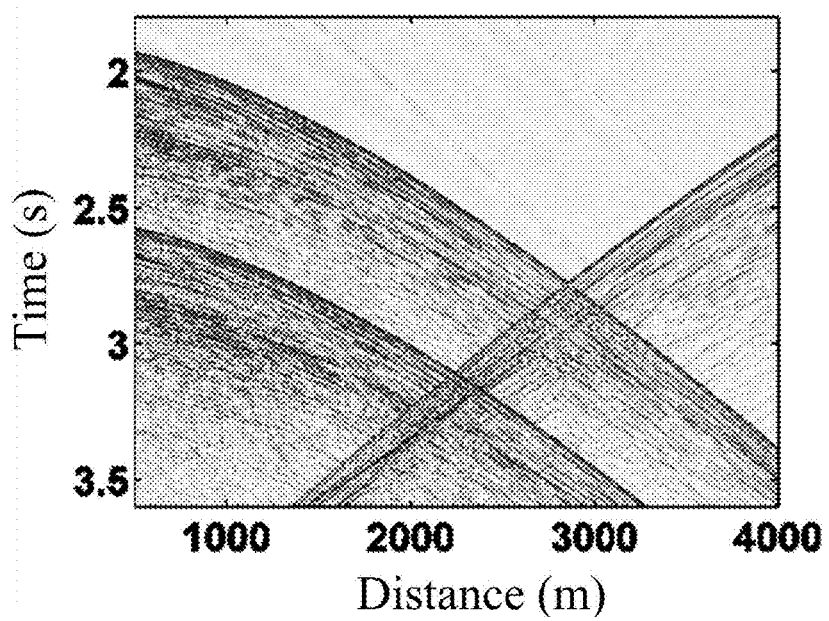
FIG. 8B is a graphical representation of seismic data after deghosting of the actual ghosted marine seismic data.
Figure 8C:
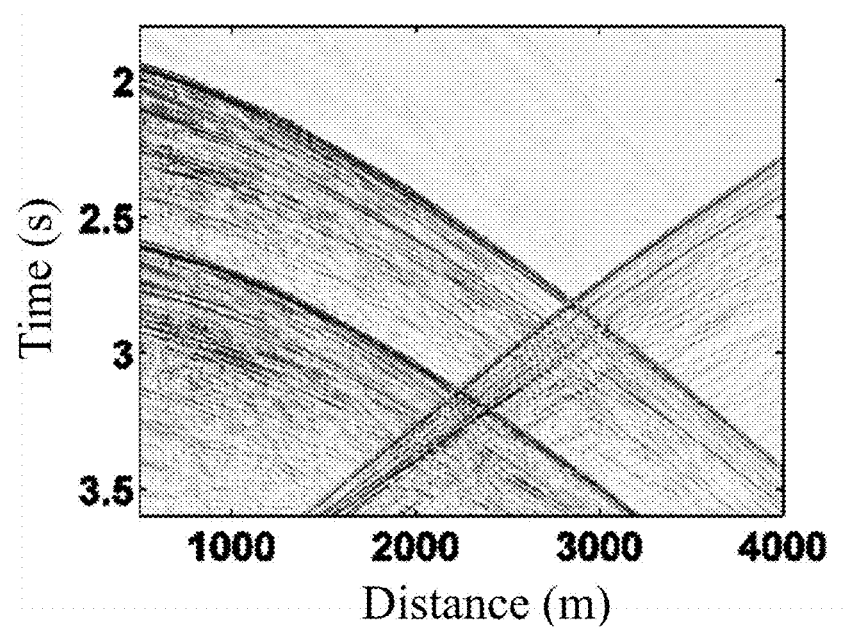
FIG. 8C is a graphical representation of ghost data after deghosting of the actual ghosted marine seismic data.

In addition, the present disclosure includes the step of conducting numerical simulation experiments of deghosting on a layered model and actual marine seismic data to verify the effectiveness of the deghosting technology of the present disclosure. Taking the multi-layer velocity model shown in FIG. 7A as an example, the seismic data before deghosting is shown in FIG. 7B, and the seismic data after deghosting is shown in FIG. 7C. It can be observed that the ghost event axis corresponding to FIG. 7C is deghosted, the primary reflection recording is preserved, and the deghosted recording has no obvious artifacts. In order to further illustrate the effect of the deghosting technology proposed in the present disclosure, the present disclosure includes numerical experiments on deghosting on actual data. FIG. 8A is a schematic diagram of actual ghosted marine seismic data; FIG. 8B is a schematic diagram of seismic data after deghosting of the actual ghosted marine seismic data; and FIG. 8C is a schematic diagram of ghost data after deghosting of the actual ghosted marine seismic data.

Figure 2:
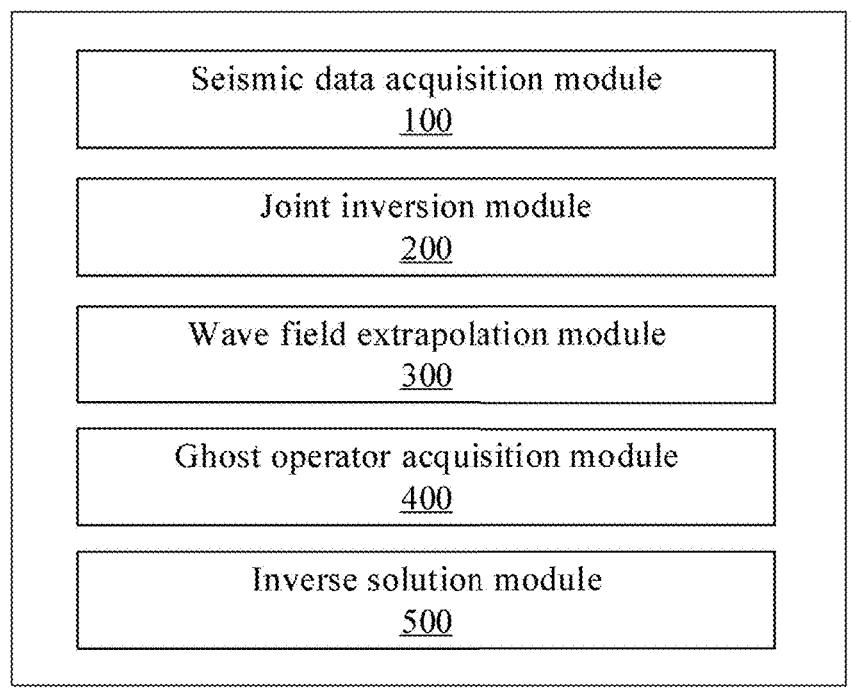
FIG. 2 is a block diagram of a system for full-waveform inversion deghosting for marine variable depth streamer data acquisition according to an embodiment of the present disclosure.

A second embodiment of the present disclosure proposes a system for full-waveform inversion deghosting for marine variable depth streamer data acquisition. As shown in FIG. 2, the system specifically includes a seismic data acquisition module 100, a joint inversion module 200, a wave field extrapolation module 300, a ghost operator acquisition module 400, and an inverse solution module 500.

The seismic data acquisition module 100 is configured to acquire seismic data in a marine seismic exploration process, including a type and dominant frequency of a source, a location of a shot point, an angular frequency, a seawater velocity, a wave field of a receiver surface $\Gamma_1$, a size of a given velocity model, and a spacing of grid points.

The joint inversion module 200 is configured to construct Lippmann-Schwinger equations of a region between the receiver surface $\Gamma_1$ and a sea surface $\Gamma_0$ and a region below the receiver surface $\Gamma_1$ and jointly solve the Lippmann-Schwinger equations based on the seismic data to obtain normal derivatives of an incident wave field $p_{in}$ and the wave field of the receiver surface $\Gamma_1$.

The wave field extrapolation module 300 is configured to perform, based on the wave field and the normal derivative thereof of the receiver surface $\Gamma_1$ and the incident wave field $p_{in}$, wave field extrapolation by a pre-constructed Kirchhoff equation that includes only an integral on the receiver surface $\Gamma_1$ to obtain a wave field of the sea surface $\Gamma_0$ recorded by a horizontal streamer.

The ghost operator acquisition module 400 is configured to acquire an up-going primary reflection, extrapolate the primary reflection upward to obtain a wave field received by a mirror streamer, and obtain a ghost operator based on a total wave field received by geophones, where the geophones are located at all grid points and the mirror streamer and a receiver are symmetrical about the sea surface.

The inverse solution module 500 is configured to subject the ghosted wave field of the sea surface $\Gamma_0$ recorded by the horizontal streamer to full-waveform inversion deghosting based on the ghost operator to acquire deghosted seismic data, that is, seismic data including only primary reflection data.

Those skilled in the art should understand that, for convenience and brevity of description, reference is made to corresponding processes in the above method embodiments for specific working processes of the system, and details are not described herein again.

It should be noted that the system for full-waveform inversion deghosting for marine variable depth streamer data acquisition provided in the above embodiment is illustrated only based on the division of the above functional modules. In practical application, the foregoing functions may be completed by different functional modules according to needs. That is, the modules or steps in the embodiments of the present disclosure can be decomposed or combined again, for example, the modules of the above embodiments can be combined into one module or further divided into a plurality of sub-modules to complete all or part of the functions described above. The names of the modules and steps involved in the embodiments of the present disclosure are only for distinguishing each module or step and should not be regarded as limitations on the present disclosure.

A third embodiment of the present disclosure provides a device, including at least one processor and a memory communicatively connected to at least one processor, where the memory stores an instruction executable by the processor, and the instruction is executed by the processor to implement the above method for full-waveform inversion deghosting for marine variable depth streamer data acquisition.

A fourth embodiment of the present disclosure proposes a computer-readable storage medium, which stores a computer instruction, where the computer instruction is executed by a computer to implement the above method for full-waveform inversion deghosting for marine variable depth streamer data acquisition.

A fifth embodiment of the present disclosure proposes an apparatus for full-waveform inversion deghosting for marine variable depth streamer data acquisition, including a seismic data acquisition device and a central processing device.

The seismic data acquisition device includes a seismic wave tester, a seismic wave detector, geophones, and a marine seismic streamer exploration device and is configured to acquire seismic data in a marine seismic exploration process, including a type and dominant frequency of a source, a location of a shot point, an angular frequency, a seawater velocity, a wave field of a receiver surface $\Gamma_1$, a size of a given velocity model, and a spacing of grid points.

The central processing device includes a graphics processing unit (GPU) and is configured to construct Lippmann-Schwinger equations of a region between the receiver surface $\Gamma_1$ and a sea surface $\Gamma_0$ and a region below the receiver surface $\Gamma_1$ and jointly solve the Lippmann-Schwinger equations based on the seismic data to obtain normal derivatives of an incident wave field $p_{in}$ and the wave field of the receiver surface $\Gamma_1$.

The central processing device is configured to perform, based on the wave field and the normal derivative thereof of the receiver surface $\Gamma_1$ and the incident wave field $p_{in}$, wave field extrapolation by a pre-constructed Kirchhoff equation that includes only an integral on the receiver surface $\Gamma_1$ to obtain a wave field of the sea surface $\Gamma_0$ recorded by a horizontal streamer. The central processing device is configured to acquire an up-going primary reflection, extrapolate the primary reflection upward to obtain a wave field received by a mirror streamer, and obtain a ghost operator based on a total wave field received by geophones, where the geophones are located at all grid points and the mirror streamer and a receiver are symmetrical about the sea surface.

The central processing device is configured to subject the ghosted wave field of the sea surface $\Gamma_0$ recorded by the horizontal streamer to full-waveform inversion deghosting based on the ghost operator to acquire deghosted seismic data, that is, seismic data including only primary reflection data.

Those skilled in the art can clearly understand that for convenience and brevity of description, reference can be made to a corresponding process in the above method embodiment for specific working processes and related descriptions of the above device, computer-readable storage medium, and apparatus for full-waveform inversion deghosting for marine variable depth streamer data acquisition. Details are not described herein again.

Figure 9:
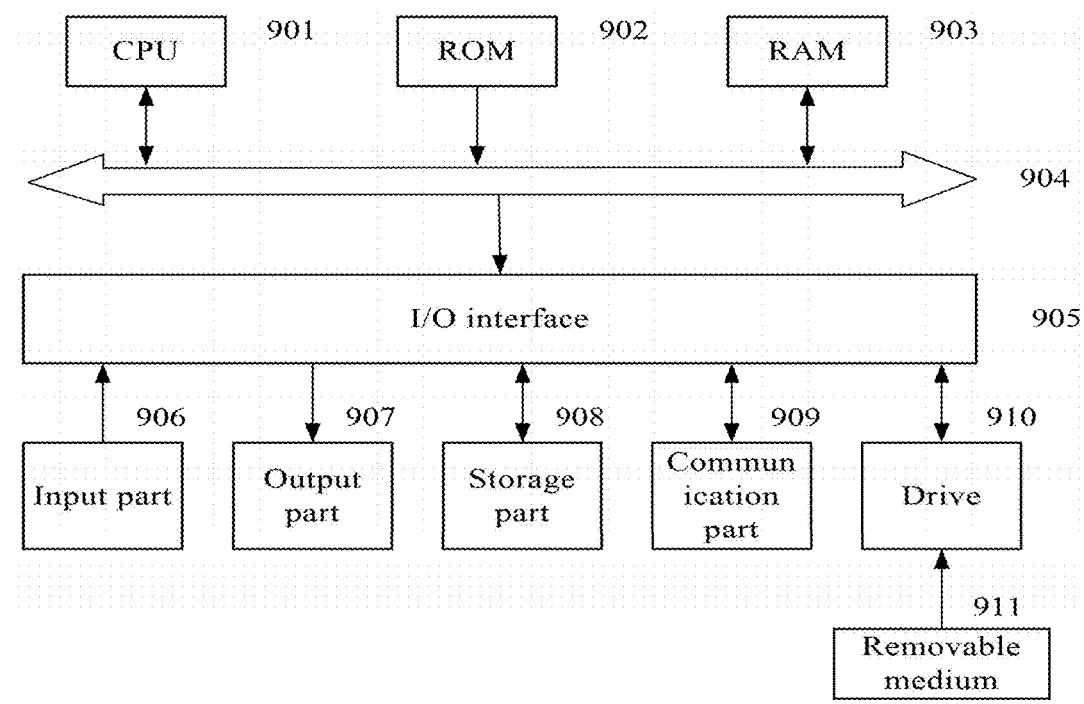
FIG. 9 is a structural diagram of a computer system of an electronic device suitable for implementing the embodiment of the present disclosure.

FIG. 9 shows a structural diagram of a computer system of a server suitable for implementing the method, system, and apparatus embodiments of the present disclosure. The server shown in FIG. 9 is merely an example and should not be conceived as a limitation to the functions and applications of the embodiments of the present disclosure.

As shown in FIG. 9, the computer system includes a central processing unit (CPU) 901, which can perform various suitable actions and processing according to a program in a read-only memory (ROM) 902 or a program loaded from a storage part 908 to a random access memory (RAM) 903. The RAM 903 further stores various programs and data required for operations of the system. The CPU 901, the ROM 902, and the RAM 903 are connected to one another through a bus 904. An input/output (I/O) interface 905 is connected to the bus 904.

The following components are connected to the I/O interface 905: an input part 906 including a keyboard, a mouse, and the like; an output part 907 including a cathode-ray tube (CRT), a liquid crystal display (LCD), a loudspeaker, and the like; the storage part 908 including a hard disk; and a communications part 909 including a network interface card, such as a local area network (LAN) card or a modem. The communication part 909 performs communication processing through a network, such as the Internet. A drive 910 is also connected to the I/O interface 905 as needed. A removable medium 911, such as a magnetic disk, an optical disk, a magneto-optical disk, or a semiconductor memory, is mounted on the drive 910 as needed so that a computer program read therefrom is installed into the storage part 908 as needed.

Particularly, according to the embodiments of the present disclosure, the process described above with reference to the flowchart may be implemented as a computer software program. For example, an embodiment of the present disclosure includes a computer program product including a computer program carried by a computer-readable medium. The computer program includes program code for executing the method shown in the flowchart. In this embodiment, the computer program may be downloaded from a network by means of the communication part and installed and/or be installed from the removable medium. When the computer program is executed by the CPU, the functions defined in the method of the present disclosure are executed. It should be noted that the computer-readable medium in the present disclosure may be a computer-readable signal medium, a computer-readable storage medium, or a combination thereof. The computer-readable storage medium, may be, for example, but is not limited to, electrical, magnetic, optical, electromagnetic, infrared, or semiconductor systems, apparatuses, devices, or any combination thereof. More specific examples of the computer-readable storage medium may include, but are not limited to: an electric connector with one or more wires, a portable computer magnetic disk, a hard disk, a RAM, a ROM, an erasable programmable read-only memory (EPROM or flash memory), an optical fiber, a portable compact disk read-only memory (CD-ROM), an optical storage device, a magnetic storage device, or any proper combination thereof. In the present disclosure, the computer-readable storage medium may be any tangible medium including or storing a program, and the program may be used by or used in combination with an instruction execution system, apparatus, or device. In the present disclosure, the computer-readable signal medium may include a data signal propagated in a baseband or propagated as a part of a carrier and carries computer-readable program code. The propagated data signal may be in various forms, including but not limited to an electromagnetic signal, an optical signal, or any suitable combination thereof. The computer-readable signal medium may alternatively be any computer-readable medium except the computer-readable storage medium. The computer-readable medium may send, propagate, or transmit a program used by or used in combination with an instruction execution system, apparatus, or device. The program code contained on the computer-readable medium may be transmitted using any suitable medium, including but not limited to wireless, wire, optical fiber, RF, or any suitable combination thereof.

The computer program code for executing the operations in the present disclosure may be compiled by using one or more program design languages or a combination thereof. The programming languages include object oriented programming languages, such as Java, Smalltalk, and C++, and conventional procedural programming languages, such as C or similar programming languages. The program code may be executed fully on a user computer, executed partially on a user computer, executed as an independent software package, executed partially on a user computer and partially on a remote computer, or executed fully on a remote computer or a server. When a remote computer is involved, the remote computer may be connected to the user computer via any type of network including a LAN or a wide area network (WAN) or may be connected to an external computer (for example, connected via the Internet by using an Internet service provider).

The flowcharts and block diagrams in the accompanying drawings illustrate system architectures, functions, and operations that may be implemented by the system, method, and computer program product according to the embodiments of the present disclosure. In this regard, each block in the flowcharts or block diagrams may represent a module, a program segment, or a part of code, and the module, the program segment or the part of code includes one or more executable instructions for implementing specified logic functions. It should also be noted that, in some alternative implementations, the functions marked in the blocks may alternatively be performed in an order different from that marked in the drawings. For example, two successively shown blocks actually may be executed in parallel substantially or may be executed in reverse order sometimes, depending on the functions involved. It should also be noted that each block in the block diagrams and/or flowcharts and combinations of the blocks in the block diagrams and/or flowcharts may be implemented by a dedicated hardware-based system for executing specified functions or operations, or may be implemented by a combination of dedicated hardware and computer instructions.

Terms such as "first" and "second" are intended to distinguish between similar objects, rather than describe or indicate a specific order or sequence.

Terms "include", "comprise" or any other variations thereof are intended to cover non-exclusive inclusions, such that a process, a method, an article, or a device/apparatus including a series of elements not only includes those elements, but also includes other elements that are not explicitly listed, or also includes inherent elements of the process, the method, the article or the device/apparatus.

The technical solutions of the present disclosure are described with reference to the preferred implementations shown in the accompanying drawings. Those skilled in the art should easily understand that the protection scope of the present disclosure is not limited to these specific implementations. Those skilled in the art can make equivalent changes or substitutions to the relevant technical features without departing from the principles of the present disclosure, and the technical solutions after these changes or substitutions should fall within the protection scope of the present disclosure.

What is claimed is:

1. A method for providing a marine seismic exploration imaging via full-waveform inversion deghosting of a marine variable depth streamer data acquisition, comprising the following steps:
   S100: acquiring, by a processor, seismic data in a marine seismic exploration process comprising a type and a dominant frequency of a source, a location of a shot point, an angular frequency, a seawater velocity, a wave field of a receiver surface $\Gamma_1$, a size of a given velocity model, and a spacing of grid points;
   S200: constructing, by the processor, Lippmann-Schwinger equations of a region between the receiver surface $\Gamma_1$ and a sea surface $\Gamma_0$ and a region below the receiver surface $\Gamma_1$, and jointly solving the Lippmann-Schwinger equations based on the seismic data to obtain normal derivatives of an incident wave field $p_{in}$ and the wave field of the receiver surface $\Gamma_1$;
   wherein the Lippmann-Schwinger equation is:

$$C(r)p(r,\omega) = p_{in}(r,\omega) \oint_{\Gamma_1} \left[ G(r',r,\omega) \frac{\partial p(r',\omega)}{\partial n} - p(r',\omega) \frac{\partial G(r',r,\omega)}{\partial n} \right] d\Gamma_1, r \in \Gamma_1$$

wherein $p_{in}$ denotes the incident wave field; r denotes the location of the shot point; $\omega$ denotes the angular frequency; r' denotes a location of a receiving point; $p(r',\omega)$ and $$\frac{\partial p(r',\omega)}{\partial n}$$

denote a wave field and a normal derivative of a closed surface, respectively; $G(r',r,\omega)$ denotes a Green's function; $C(r)$ denotes a coefficient related to a local geometric feature of the surface; $p(r,\omega)$ denotes a wave field value after extension; and $$\frac{\partial}{\partial n}$$

denotes a normal derivative;
   S300: performing, by the processor and based on the wave field, the normal derivative of the receiver surface $\Gamma_1$, and the incident wave field $p_{in}$, wave field extrapolation by a pre-constructed Kirchhoff equation that comprises only an integral on the receiver surface $\Gamma_1$ to obtain a wave field of the sea surface $\Gamma_0$ recorded by a horizontal streamer;
   S400: acquiring, by the processor, an up-going primary reflection, extrapolating the primary reflection upward to obtain a wave field received by a mirror streamer, and obtaining a ghost operator based on a total wave field received by geophones, wherein the geophones are located at all grid points and the mirror streamer and a receiver are symmetrical about the sea surface;
   S500: subjecting, by the processor, a ghosted wave field of the sea surface $\Gamma_0$ recorded by the horizontal streamer to a full-waveform inversion deghosting based on the ghost operator to acquire deghosted seismic data, wherein the deghosted seismic data comprises only primary reflection data; and
   S600: providing, by the processor, a marine seismic exploration imaging based on the deghosted seismic data.

2. The method for providing the marine seismic exploration imaging via the full-waveform inversion deghosting of the marine variable depth streamer data acquisition according to claim 1, wherein the pre-constructed Kirchhoff equation that comprises only the integral on the receiver surface $\Gamma_1$ is:

$$p(r,\omega) = \oint_{\Gamma_1} \left[ G(r',r,\omega) \frac{\partial p(r',\omega)}{\partial n} - p(r',\omega) \frac{\partial G(r',r,\omega)}{\partial n} \right] d\Gamma_1.$$

3. The method for providing the marine seismic exploration imaging via the full-waveform inversion deghosting of the marine variable depth streamer data acquisition according to claim 2, wherein when the pre-constructed Kirchhoff equation that comprises only the integral on the receiver surface $\Gamma_1$ is constructed, a medium above the sea surface $\Gamma_0$ is assumed to be homogeneous to avoid reflection of any wave field, and boundaries on two sides are assumed to be at infinity.

4. The method for providing the marine seismic exploration imaging via the full-waveform inversion deghosting of the marine variable depth streamer data acquisition according to claim 3, wherein the ghost operator is calculated as follows:

$$p = p_0 o_m = p_0 - EP_0 = GP_0$$

wherein p denotes the total wave field received by the geophones; $p_0$ denotes the up-going primary reflection; $p_m$ denotes the wave field received by the mirror streamer; E denotes the wave field extension operator; and G denotes the ghost operator, wherein $G = I - E$, with I being an identity matrix.

5. The method for providing the marine seismic exploration imaging via the full-waveform inversion deghosting of the marine variable depth streamer data acquisition according to claim 4, wherein the full-waveform inversion deghosting on the ghosted wave field of the sea surface recorded by the horizontal streamer is expressed by:

$$\min_{p_0} J(p_0) = \frac{1}{2}\|p - Gp_0\|_2^2 + \lambda|p_0|_1$$

wherein $|\;|_1$ denotes a 1-norm; $\|\;\|_2^2$ denotes a 2-norm; $\lambda$ denotes a regularization term; and J( ) denotes an objective function.

6. A device, comprising:
at least one processor; and
a memory communicatively connected to the at least one processor, wherein
the memory stores an instruction executable by the processor, and the instruction is executed by the processor to implement the method for providing the marine seismic exploration imaging via the full-waveform inversion deghosting of the marine variable depth streamer data acquisition according to claim 1.

7. The device according to claim 6, wherein the pre-constructed Kirchhoff equation that comprises only the integral on the receiver surface $\Gamma_1$ is:

$$p(r,\omega) = \oint_{\Gamma_1}\left[G(r',r,\omega)\frac{\partial p(r',\omega)}{\partial n} - p(r',\omega)\frac{\partial G(r',r,\omega)}{\partial n}\right]d\Gamma_1.$$

8. The device according to claim 7, wherein when the pre-constructed Kirchhoff equation that comprises only the integral on the receiver surface $\Gamma_1$ is constructed, a medium above the sea surface $\Gamma_0$ is assumed to be homogeneous to avoid reflection of any wave field, and boundaries on two sides are assumed to be at infinity.

9. The device according to claim 8, wherein the ghost operator is calculated as follows:

$$p = p_0 p_m = p_0 - EP_0 = GP_0$$

wherein p denotes the total wave field received by the geophones; $p_0$ denotes the up-going primary reflection; $p_m$ denotes the wave field received by the mirror streamer; E denotes the wave field extension operator; and G denotes the ghost operator, wherein G=I−E, with I being an identity matrix.

10. The device according to claim 9, wherein the full-waveform inversion deghosting on the ghosted wave field of the sea surface recorded by the horizontal streamer is expressed by:

$$\min_{p_0} J(p_0) = \frac{1}{2}\|p - Gp_0\|_2^2 + \lambda|p_0|_1$$

wherein $|\;|_1$ denotes a 1-norm; $\|\;\|_2^2$ denotes a 2-norm; $\lambda$ denotes a regularization term; and J( ) denotes an objective function.

11. A non-transitory computer-readable storage medium storing a computer instruction, wherein the computer instruction is executed by a computer to implement the method for providing the marine seismic exploration imaging via the full-waveform inversion deghosting of the marine variable depth streamer data acquisition according to claim 1.

12. The non-transitory computer-readable storage medium according to claim 11, wherein the pre-constructed Kirchhoff equation that comprises only the integral on the receiver surface $\Gamma_1$ is:

$$p(r,\omega) = \oint_{\Gamma_1}\left[G(r',r,\omega)\frac{\partial p(r',\omega)}{\partial n} - p(r',\omega)\frac{\partial G(r',r,\omega)}{\partial n}\right]d\Gamma_1.$$

13. The non-transitory computer-readable storage medium according to claim 12, wherein when the pre-constructed Kirchhoff equation that comprises only the integral on the receiver surface $\Gamma_1$ is constructed, a medium above the sea surface $\Gamma_0$ is assumed to be homogeneous to avoid reflection of any wave field, and boundaries on two sides are assumed to be at infinity.

14. The non-transitory computer-readable storage medium according to claim 13, wherein the ghost operator is calculated as follows:

$$p = p_0 - p_m = p_0 - EP_0 = GP_0$$

wherein p denotes the total wave field received by the geophones; $p_0$ denotes the up-going primary reflection; $p_m$ denotes the wave field received by the mirror streamer; E denotes the wave field extension operator; and G denotes the ghost operator, wherein G=I−E, with I being an identity matrix.

15. The non-transitory computer-readable storage medium according to claim 14, wherein the full-waveform inversion deghosting on the ghosted wave field of the sea surface recorded by the horizontal streamer is expressed by:

$$\min_{p_0} J(p_0) = \frac{1}{2}\|p - Gp_0\|_2^2 + \lambda|p_0|_1$$

wherein $|\;|_1$ denotes a 1-norm; $\|\;\|_2^2$ denotes a 2-norm; $\lambda$ denotes a regularization term; and J( ) denotes an objective function.

16. A system for providing a marine seismic exploration imaging via full-waveform inversion deghosting of a marine variable depth streamer data acquisition comprising: a seismic data acquisition module, a joint inversion module, a wave field extrapolation module, a ghost operator acquisition module, and an inverse solution module, wherein
the seismic data acquisition module is configured to acquire seismic data in a marine seismic exploration process comprising a type and a dominant frequency of a source, a location of a shot point, an angular frequency, a seawater velocity, a wave field of a receiver surface $\Gamma_1$, a size of a given velocity model, and a spacing of grid points;
the joint inversion module is configured to construct Lippmann-Schwinger equations of a region between the receiver surface $\Gamma_1$ and a sea surface $\Gamma_0$ and a region below the receiver surface $\Gamma_1$, and jointly solve the Lippmann-Schwinger equations based on the seismic data to obtain normal derivatives of an incident wave field $p_{in}$ and the wave field of the receiver surface $\Gamma_1$;

wherein the Lippmann-Schwinger equation is:

$$C(r)p(r,\omega) = p_{in}(r,\omega) \oint_{\Gamma_1} \left[ G(r',r,\omega)\frac{\partial p(r',\omega)}{\partial n} - p(r',\omega)\frac{\partial G(r',r,\omega)}{\partial n} \right] d\Gamma_1, r \in \Gamma_1$$

wherein $p_{in}$ denotes the incident wave field; r denotes the location of the shot point; $\omega$ denotes the angular frequency; r' denotes a location of a receiving point; p(r', $\omega$) and $$\frac{\partial p(r',\omega)}{\partial n}$$

denote a wave field and a normal derivative of a closed surface, respectively; G(r', r, $\omega$) denotes a Green's function; C(r) denotes a coefficient related to a local geometric feature of the surface; p(r, $\omega$) denotes a wave field value after extension; and $$\frac{\partial}{\partial n}$$

denotes a normal derivative;

the wave field extrapolation module is configured to perform, based on the wave field, the normal derivative of the receiver surface $\Gamma_1$, and the incident wave field $p_{in}$, wave field extrapolation by a pre-constructed Kirchhoff equation that comprises only an integral on the receiver surface $\Gamma_1$ to obtain a wave field of the sea surface $\Gamma_0$ recorded by a horizontal streamer;

the ghost operator acquisition module is configured to acquire an up-going primary reflection, extrapolate the primary reflection upward to obtain a wave field received by a mirror streamer and obtain a ghost operator based on a total wave field received by geophones, wherein the geophones are located at all grid points, and the mirror streamer and a receiver are symmetrical about the sea surface; and the inverse solution module is configured to subject a ghosted wave field of the sea surface $\Gamma_0$ recorded by the horizontal streamer to a full-waveform inversion deghosting based on the ghost operator to acquire deghosted seismic data, wherein the deghosted seismic data comprises only primary reflection data;

wherein the system is configured to provide a marine seismic exploration imaging based on the deghosted seismic data.

* * * * *